April 3, 1962 B. R. EICHBAUM 3,028,336

CADMIUM MANGANESE FERROSPINEL COMPOSITION

Filed Sept. 25, 1957 2 Sheets-Sheet 1

INVENTOR.
BARLANE R. EICHBAUM

BY William V. Schelberg
AGENT

April 3, 1962 B. R. EICHBAUM 3,028,336

CADMIUM MANGANESE FERROSPINEL COMPOSITION

Filed Sept. 25, 1957 2 Sheets-Sheet 2

United States Patent Office 3,028,336

Patented Apr. 3, 1962

3,028,336

CADMIUM MANGANESE FERROSPINEL COMPOSITION

Barlane R. Eichbaum, Poughkeepsie, N.Y., assignor to International Business Machines Corporation, New York, N.Y., a corporation of New York Filed Sept. 25, 1957, Ser. No. 686,215
5 Claims. (Cl. 252—62.5)

This invention relates to novel compositions of matter in the class known as ferrospinels which exhibit essentially high B*r*/B*s* hysteresis loop characteristics. More particularly, it relates to improved compositions in this class comprising cadmium-manganese ferrospinels.

Since the discovery that certain of the ferrospinels have square hysteresis loops, a property which makes them especially desirable in application for magnetic storage devices in computer mechanisms, it has been the object of considerable research to provide ferrospinels having improved magnetic characteristics.

This invention is based upon the discovery that the ferrite system CdO—MnO—$Fe_2O_3$, within a composition range described, exhibits a number of magnetic properties which are distinctly advantageous for use as a magnetic core material.

Among the objects of this invention is to provide a novel mixed ferrite material which has a very low coercive force, of the order of 0.8 oersted or less.

Another object of this invention is to provide a ferrospinel with a very low switching time, of 350 millimicroseconds or less at one ampere drive current.

Another object of this invention is to provide a ferrospinel having high B*r*/B*s* ratio hysteresis loop properties of 0.7 or greater.

Another object of this invention is to provide a ferrospinel with a high discrimination between the voltage outputs obtained when the ferrite material is switched from one remanence state toward saturation in the opposite direction and from the one remanence state toward saturation in the same direction of magnetization.

Still another object of the invention is to provide improved ferrite compositions with magnetic characteristics especially suitable for use in binary information handling systems and devices such as magnetic memory apparatus.

Other objects of the invention will be pointed out in the following description and claims and illustrated in the accompanying drawings, which disclose, by way of example, the principle of the invention and the best mode, which has been contemplated, of applying that principle.

Figure 1:
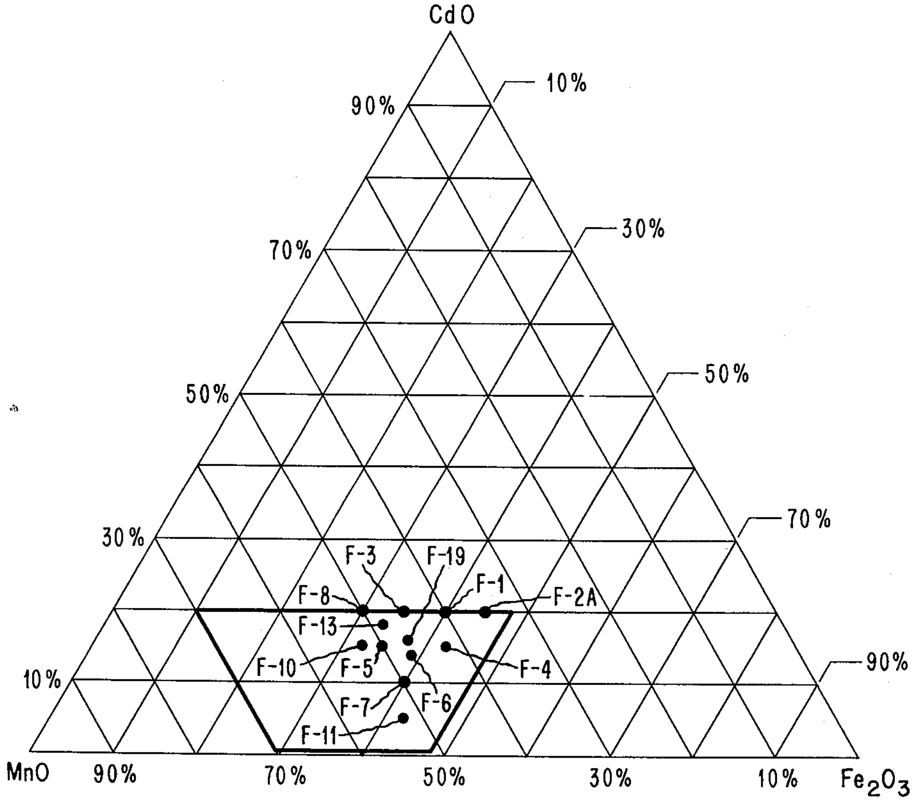
FIG. 1 is a graphical representation in a tri-axial diagram of the composition range in the ferrospinel system CdO—MnO—$Fe_2O_3$ which has the desired magnetic characteristics.
Figure 2:
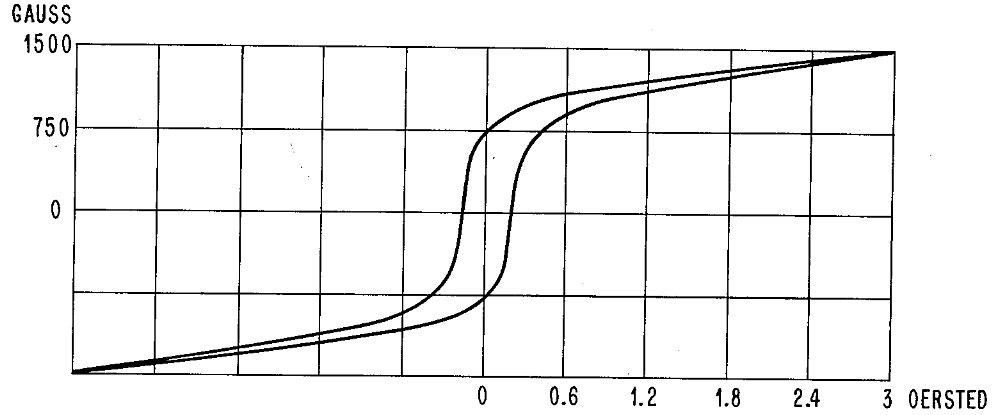
FIG. 2 is a reproduction of oscilloscope pictures of the hysteresis loop obtained for a cadmium-manganese ferrospinel (code No. F–1) according to the present invention using drive current pulses of one ampere having a rise time of 50 millimicroseconds.
Figure 3:
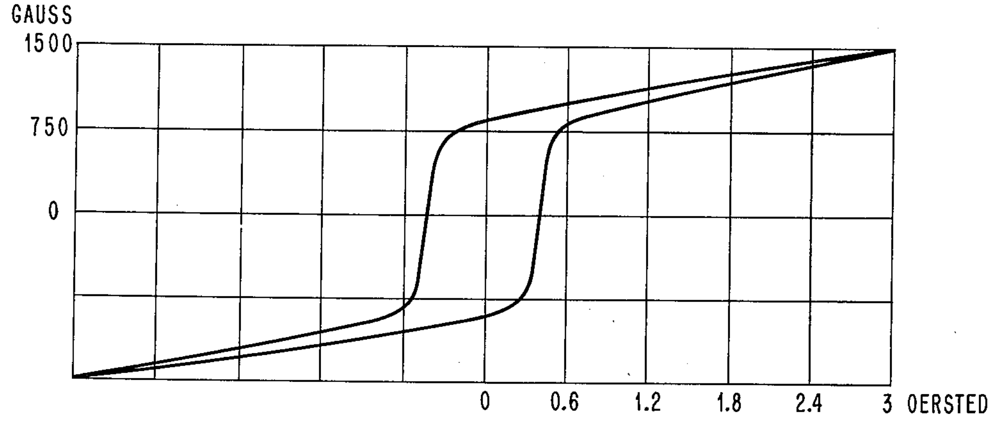
FIG. 3 is a similar picture for code No. F–12 showing the effect of small additions of NiO.

In a copending application Serial No. 690,303 to James M. Brownlow and Barlane R. Eichbaum, filed October 15, 1957, and assigned the same assignee as the present application, it has been demonstrated that certain constituents of ferrospinels, including cadmium oxide and zinc oxide, undergo transformations during the sintering process which result in volatilization and loss of these constituents. Therefore, we have found it advantageous to carefully control the firing conditions in the preparation of the ferrospinels of the present invention. Conventional firing methods, for example, heating the presintered cores in an open boat under an oxidizing atmosphere at 1000–1200° C. for fifteen minutes to three hours, while they will produce a square loop material, will result in a loss of cadmium oxide. Such conventional firing methods also result in a concentration gradient in the cadmium oxide constituent which has been found to be detrimental to the magnetic properties of cores formed from these ferrites. Therefore, to supplement conventional firing methods, we have developed sintering techniques, described in more detail in the aforementioned copending application, which suppresses the volatilization of the cadmium oxide portion of the ferrospinel and produces a ferrite having a homogeneous distribution of cadmium oxide in the sintered core.

The novel method described in the above referred to copending application differs from previous methods in that the presintered cores are contained in a small platinum boat to which is added a separate quantity of ferrite powders of the same composition as the core material and in that the boat is provided with a platinum cover to keep excessive gaseous currents out of the boat. By using this technique, the composition of the presintered core will be essentially the same as the composition of the sintered core.

The ferrites of the present invention are prepared in the following manner: The ferrite powders are calcined at a temperature of approximately 1000° for a period of one to two hours and thoroughly mixed so as to form a homogeneous mixture of predetermined proportions. The mixture is subsequently ground so that the largest grain size is less than ten microns and a small percentage of lubricant material such as a monocrystalline wax or magnesium stearate and polyvinyl alcohol is added to reduce skin friction and warping during molding. The mixture is compacted in a steel die with sufficient pressure to form a closely coherent body, usually greater than 40,000 pounds per square inch. The pressed body is then calcined at 800–1000° C. to drive off the binder materials and moisture. The presintered body thus produced is enclosed in the covered receptacle as described, heated at 1000° C.–1500° C. for from 15–30 minutes, furnace cooled to 950° C. during an additional 5–60 minutes and finally metal plate quenched to room temperature.

Using this method, a number of compositions in the cadmium-manganese ferrite system were prepared. A summary of those compositions having the most desirable magnetic characteristics for computer type circuits is given in the table. A comparison of magnetic properties is made with a typical magnesium-manganese ferrospinel (F–15) commonly used in similar circuits. The ferrite bodies from which the properties listed below were established were toroidal in shape having an outside diameter of approximately 80 milli-inches, an inside diameter of approximately 50 milli-inches and a thickness of about 28 milli-inches. The switching time, T*s*, was defined as the duration of the output voltage pulse, as measured between the 10% amplitude points, when the core was driven by current pulses of 1 ampere.

The discrimination ratio may be defined as the ratio of the voltage output obtained when a magnetic core is read out from the undisturbed "1" remanence state to the voltage output obtained when a magnetic core is read out from the undisturbed "0" remanence state. Since the core element must be able to differentiate between the "one" and "zero" remanence states, the discrimination ratio should be quite high, preferably of the order of four or more. The B*r*/B*s* ratio is the ratio of the magnetic flux in the core at the remanence state to the magnetic flux at saturation. Since this ratio will vary with the drive current pulse it was measured using 1 ampere pulses. H*c* may be defined as that applied magnetizing force which is necessary to switch the core from one remanence state to another. These magnetic characteristics indicate the usefulness of a ferrite material as a storage element.

*Table*

| Code No. | Composition (Mole Percent) | | | Discrimination Ratio | Switching Time Ts (mμ sec.) | Coercive Force Hc (oe.) | Br/Bs |
|---|---|---|---|---|---|---|---|
| | CdO | MnO | $Fe_2O_3$ | | | | |
| F-1 | 20 | 40 | 40 | 5.0 | 90 | 0.2 | 0.8 |
| F-2 [1] | 20 | 40 | 40 | 5.0 | 70 | 0.2 | 0.8 |
| F-2A | 20 | 35 | 45 | 5.0 | 90 | 0.25 | 0.8 |
| F-3 | 20 | 45 | 35 | 4.5 | 90 | 0.2 | 0.75 |
| F-4 | 15 | 42.5 | 42.5 | 6.1 | 140 | 0.45 | 0.9 |
| F-5 | 15 | 50 | 35 | 10 | 120 | 0.4 | 0.9 |
| F-6 | 14.3 | 47.6 | 38.1 | 9.8 | 115 | 0.3 | 0.85 |
| F-7 | 10 | 50 | 40 | 8.0 | 180 | 0.6 | 0.9 |
| F-8 | 20 | 50 | 30 | 4 | 180 | 0.3 | 0.8 |
| F-9 | 16 | 37 | 47 | 9.8 | 110 | 0.3 | 0.9 |
| F-10 | 15 | 53 | 32 | 6.0 | 130 | 0.3 | 0.8 |
| F-11 | 5 | 52.5 | 42.5 | 10 | 350 | 0.8 | 0.95 |
| F-12 [2] | 18.4 | 38.3 | 38.3 | 4.3 | 140 | 0.3 | 0.85 |
| F-13 | 18 | 48 | 34 | 10 | 115 | 0.4 | 0.9 |
| F-14 [3] | 25 | 37.5 | 37.5 | 2.5 | 250 | 0.4 | 0.8 |
| F-15 | 37.5 (MgO) | 22.5 | 40 | 9.4 | 520 | 1.3 | 0.9 |

[1] Results of 30 milli-inches inside diameter, 50 milli-inches outside diameter and 12 milli-inches thickness toroids.
[2] 5 mol percent NiO added.
[3] 3 hours at 1200° in an open boat.

As can be seen from the above table, the switching times are of the order of 2–5 times as fast as other commonly used magnetic core materials, the coercive forces are two to ten times lower, the Br/Bs values are comparable and the discrimination ratios are nearly as high. Using a toroidal core having inside diameter of 30 milli-inches, an outside diameter of 50 milli-inches and a thickness of 12 milli-inches, of the composition of F–1, the switching time is reduced to 70 mμ seconds; the reduction of Ts is largely due to the reduced mean diameter and wall thickness. A further reduction of Ts could be accomplished using still smaller cores.

As shown in the figures and in the table, most of these materials exhibit a high Br/Bs ratio hysteresis loop with a somewhat rounded knee characteristic. Low cadmium containing bodies, such as F–11, however, exhibit a more nearly square hysteresis loop, i.e., a high Br/Bs ratio with a sharp knee. With these magnetic characteristics, the materials of the present invention have found wide applicability as high speed memory cores, matrix switch cores, and as binary devices in logical circuits.

Applicant has found that compositions containing 50 mol percent of $Fe_2O_3$ are unsuitable for computer type circuits since they show marked departure from square loop characteristics. For example, the ferrite compositions, 20 mol percent CdO—30 mol percent MnO—50 mol percent $Fe_2O_3$ and 15 mol percent CdO—35 mol percent MnO—50 mol percent $Fe_2O_3$, show discrimination ratios of only 1.5.

While an upper limit of cadmium concentration in the sintered ferrite core of about 20 mol percent is described, it is to be noted that any heating conditions which permit a higher cadmium oxide concentration in the presintered ferrite mixture to be reduced by volatilization to applicant's optimum concentration range in the sintered core is to be considered within the scope of the present invention. For example, if one starts with a mixture containing 25 mol percent CdO, 37.5 mol percent MnO, and 37.5 mol percent $Fe_2O_3$ (F–14 in the table), and fires for three hours at 1200° C. under conditions permitting volatilization of cadmium, a ferrite having acceptable Br/Bs loop characteristics is obtained. The same mixture when heated under conditions which suppresses the volatilization of cadmium gives a sintered core having essentially non-usable hysteresis loop characteristics.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A high speed ferrite composition of the cadmium-manganese ferrite type which exhibits a Br/Bs ratio greater than 0.7, a coercive force less than 0.8 oersteds, a discrimination ratio of at least 4 and switching times of less than 350 millimicroseconds at one ampere drive current consisting essentially of the reaction product produced by heating together a mixture of about 15–20 mol percent CdO, 32–70 mol percent MnO, 10–48 mol percent $Fe_2O_3$ and 0–5 mol percent NiO in a non-reducing atmosphere at a temperature within the range 1000–1500° C. for 15 minutes to 3 hours, in an enclosure which limits volatilization of cadmium during said heating, cooling to about 950° C. during an additional 5–60 minutes and thereafter quenching to room temperature.

2. A high speed ferrite composition of the cadmium-manganese ferrite type which exhibits a Br/Bs ratio greater than 0.7, a coercive force less than 0.6 oersted, a discrimination ratio of at least 4 and switching times of less than 180 millimicroseconds at one ampere drive current consisting essentially of the reaction product produced by heating together a mixture of 15–20 mol percent CdO, 35–53 mol percent MnO, 30–47 mol percent $Fe_2O_3$ in a non-reducing atmosphere at a temperature within the range 1000–1500° C. for 15 minutes–3 hours, in an enclosure which limits volatilization of cadmium during said heating, cooling to about 950° C. during an additional 5–60 minutes and thereafter quenching to room temperature.

3. A high speed ferrite composition of the cadmium-manganese ferrite type which exhibits a Br/Bs ratio of 0.8, a coercive force of 0.2 oersted, a discrimination ratio of 5, and a switching time of 70 millimicroseconds at one ampere drive current consisting essentially of the reaction product produced by heating together an intimate mixture of 20 mol percent CdO, 40 mol percent MnO and 40 mol percent $Fe_2O_3$ in an air atmosphere at a temperature within the range 1000–1500° C. for 15 minutes to 3 hours in an enclosure which limits volatilization of cadmium during said heating, cooling to about 950° C. during an additional 5–60 minutes and thereafter quenching to room temperature.

4. A fired ferrite composition which exhibits a Br/Bs ratio of 0.9, a coercive force of 0.4 oersted, a discrimination ratio of 10 and a switching time of 120 millimicroseconds at one empere drive current, consisting essentially of the reaction product produced by heating together an intimate mixture of 15 mol percent CdO, 50 mol percent MnO and 35 mol percent $Fe_2O_3$ in a confined air atmosphere at a temperature within the range 1000–1500° C. for 15 minutes to 3 hours in an enclosure which limits volatilization of cadmium during said heating, cooling to about 950° C. during an additional 5–60 minutes and thereafter quenching to room temperature.

5. A fired ferrite composition which exhibits a $Br/Bs$ ratio of 0.85, a coercive force of 0.3 oersted, a switching time of 140 millimicroseconds at one ampere drive current, and a discrimination ratio of 4.3, consisting essentially of the reaction product produced by heating together an intimate mixture of 18.4 mol percent CdO, 38.3 mol percent MnO, 38.3 mol percent $Fe_2O_3$, and 5 mol percent NiO in an air atmosphere at a temperature within the range 1000–1500° C. for 15 minutes–3 hours in an enclosure which limits volatilization of cadmium during said heating, cooling to about 950° C. during an additional 5–60 minutes and thereafter quenching to room temperature.

References Cited in the file of this patent

UNITED STATES PATENTS

| | | |
|---|---|---|
| 2,549,089 | Hegyi | Apr. 17, 1951 |
| 2,565,861 | Leverenz et al. | Aug. 28, 1951 |
| 2,715,109 | Albers-Schoenberg | Aug. 9, 1955 |
| 2,950,251 | Weisz | Aug. 23, 1960 |

FOREIGN PATENTS

| | | |
|---|---|---|
| 730,703 | Great Britain | May 25, 1955 |
| 735,375 | Great Britain | Aug. 17, 1955 |
| 754,370 | Great Britain | Aug. 8, 1956 |
| 760,035 | Great Britain | Oct. 31, 1956 |
| 492,669 | Canada | May 5, 1953 |
| 1,128,631 | France | Aug. 8, 1956 |

OTHER REFERENCES

Wijn et al.: Philips Tech. Rev., vol. 16, No. 2, pp. 55, 56, August 1954.

Economos: J. Amer. Ceramic Soc., vol. 28, pp. 241–244 (July 1955), pp. 292–297 (August 1955), pp. 353–357 (October 1955).